United States Patent [19]

McNutt

[11] Patent Number: 5,460,373
[45] Date of Patent: Oct. 24, 1995

[54] RESTRAINT FOR GRASPING LIMBS AND APPENDAGES

[76] Inventor: Dennis M. McNutt, 2865 Drake Ave., Costa Mesa, Calif. 92626

[21] Appl. No.: 355,632

[22] Filed: Dec. 14, 1994

Related U.S. Application Data

[63] Continuation-in-part of Ser. No. 178,782, Jan. 7, 1994.
[51] Int. Cl.$^6$ .......................... A63B 59/00; A01K 97/14
[52] U.S. Cl. ...................... 273/84 R; 294/19.1; 119/807
[58] Field of Search ............................ 273/84 R, 84 ES; 294/19.1, 19.3; 43/5, 6, 59, 63; 119/801, 806, 807, 808

[56] References Cited

U.S. PATENT DOCUMENTS

| | | | |
|---|---|---|---|
| 1,112,867 | 10/1914 | Taylor | 119/806 |
| 1,197,303 | 9/1916 | Paxton | 119/806 |
| 1,990,686 | 2/1935 | Einhorn et al. | 43/5 |
| 2,428,734 | 10/1947 | Blackford | 119/806 |
| 5,174,057 | 12/1992 | Sienel | 294/19.1 |

FOREIGN PATENT DOCUMENTS

| 2599586 | 12/1987 | France | 119/807 |
|---|---|---|---|

Primary Examiner—V. Millin
Assistant Examiner—William M. Pierce
Attorney, Agent, or Firm—Roy A. Ekstrand

[57] ABSTRACT

A restraint for grasping limbs and appendages includes an elongated pole having a generally U-shaped pair of arms extending from the forward end thereof. A pair of jaws are pivotally secured to the end portions of the U-shaped arms and are pivotally movable between opened and closed positions. A ratchet mechanism is operative upon each of the pivotable jaws to permit inward movement of the jaws with substantial ease while preventing outward pivotal movement of the jaws. A pair of flexible bands are coupled in a criss-cross attachment between the outer ends of each pivotal jaw and the oppositely positioned U-shaped portion arms. The intersecting point of the criss-crossing flexible bands supports an encircling annular ring. As the restraint is thrust against a target limb or appendage positioned between the U-shaped portions and pivotal jaws, the flexible bands curve about the target appendage drawing the pivotal jaws inwardly in an enclosing pivotal motion which is permitted by the ratchet mechanism. Thereafter, release is resisted by the ratchet mechanisms operative upon the pivotal jaws.

8 Claims, 1 Drawing Sheet

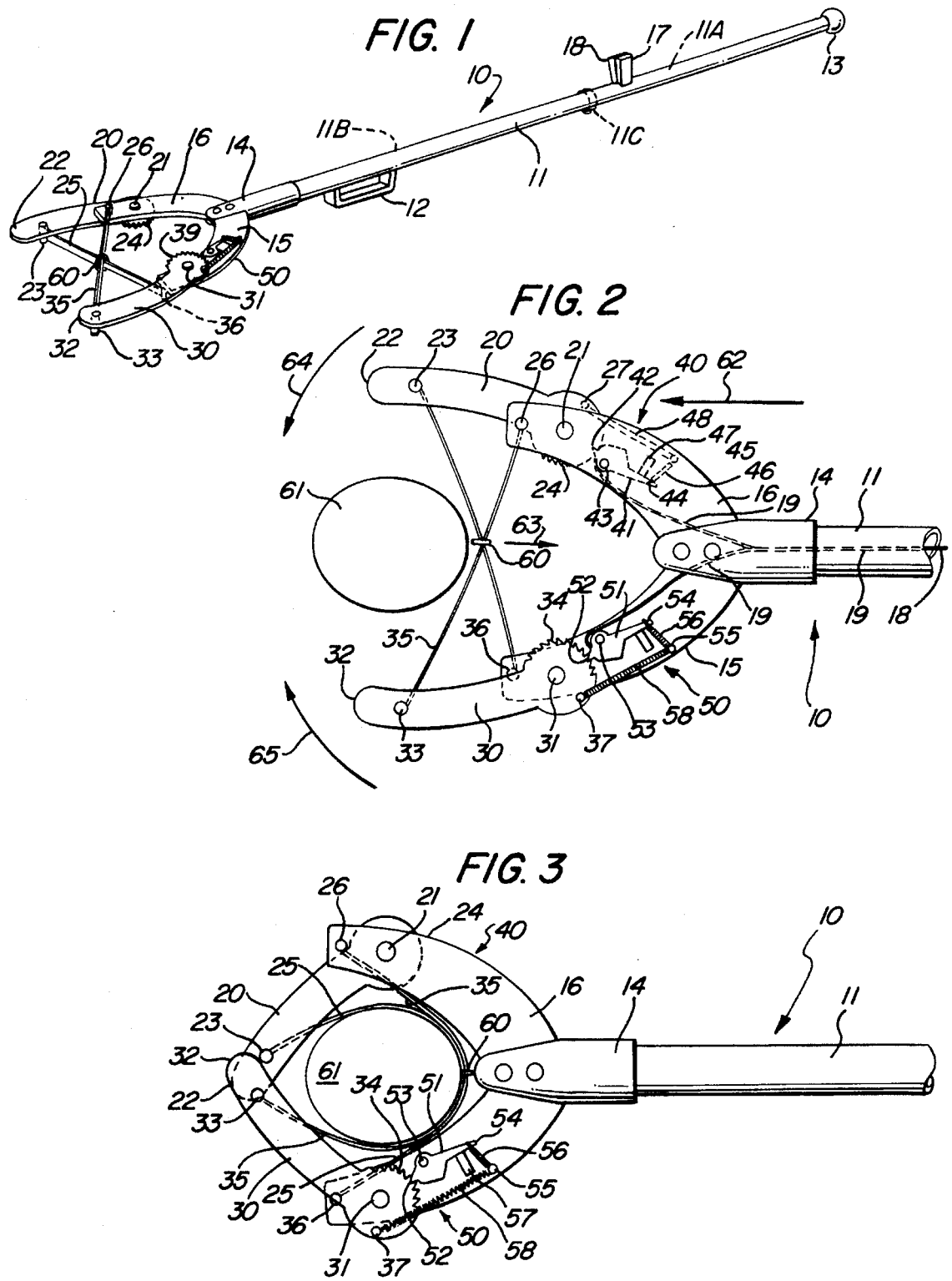

RESTRAINT FOR GRASPING LIMBS AND APPENDAGES

CROSS-REFERENCE TO RELATED PATENT APPLICATION

This application is a continuation-in-part of copending application Ser. No. 08/178,782 filed Jan. 7, 1994, in the name of the applicant of the present application and entitled HUMAN RESTRAINT OR HOBBLE which is incorporated herein by reference.

FIELD OF THE INVENTION

This invention relates generally to apparatus used to subdue or restrain a human subject.

BACKGROUND OF THE INVENTION

The process of immobilizing or restraining a resisting subject without causing serious injury to the subject or an arresting officer has been and continues to be one of the most difficult problems facing law enforcement officers. In a typical situation, one or more law enforcement officers are confronted with a hostile often physically aggressive and strong subject who is unwilling to submit to law enforcement officer control. All too frequently, such persons are emotionally distraught, or worse, under the influence of intoxicants or drugs and thus are unable to be dealt with in a reasonable fashion. In such circumstances, public safety and effective law enforcement requires that police officers utilize whatever force is reasonably necessary to subdue and control such an individual. The legal and societal constraints upon police officers in subduing a hostile subject restricts the force exercisable by the police officer and the injury to the subject tolerated.

Similar problems often arise in other circumstances such as the control of patients within mental health facilities, drug treatment facilities, or private security forces employed by property owners to protect customers and property assets.

In attempting to meet the need to provide effective restraint apparatus and subject immobilizing apparatus without imparting serious injury to the subject, practitioners in the art have provided various devices and systems. These attempts have included chemical agent sprays such as the well known mace and pepper spray apparatus in which a pressurized canister contains the mace or pepper spray chemical together with a pressurized vehicle and trigger controlled spray nozzle to facilitate spraying a chemical material upon a subject. Additional devices such as police batons, electric shock prods often called "cattle prods" and devices known as stun guns or tasers have also been provided. Unfortunately, the use of police batons often seriously injures the subject due to the substantial damage required to be caused before a subject becomes immobilized. Similar lack of success has been experienced with electric shock apparatus such as cattle prods, stun guns and tasers, due in part to the insulating effect of outer clothing and the need for precision application for maximum effect.

Additional devices have been provided for law enforcement restraints such as that set forward in U.S. Pat. No. 4,426,079, issued to Mason which sets forth a POLICE RESTRAINT DEVICE utilizing the principle of a second class lever which comprises an arm clamp having two rigid elongated handles or sticks adapted to be held and manipulated manually. A single strong flexible cord or rope of predetermined length extends between the distal ends of the handles to form an integral junction therebetween. Each end of the cord is snugly enclosed with a crimped metal cap or sleeve inserted into a blind or at the distal end of the associated stick.

In a related patent U.S. Pat. No. 4,534,097, also issued to Mason, there is set forth a METHOD OF MAKING A POLICE RESTRAINT DEVICE in which the fabrication of a police restraint device having a pair of handles or sticks having a strong flexible cord or rope extending between the end portions thereof is set forth.

While the foregoing described prior art devices have, in some circumstances, proven adequate and are often used by various law enforcement officers or the like, their success has been extremely limited and a continuing need in the art exists for a more effective humane and less injurious method and apparatus for restraining and immobilizing a resisting subject.

SUMMARY OF THE INVENTION

Accordingly, it is a general object of the present invention to provide an improved human restraint or hobble. It is a more particular object of the present invention to provide an improved human restraint or hobble which avoids serious injury to the resisting subject while facilitating secure control by the law officer. It is a still more particular object of the present invention to provide an improved human restraint or hobble which protects the law enforcement officer from close contact and risk of injury in restraining a hostile resisting subject.

In accordance with the present invention, there is provided for use in grasping an appendage or limb, a restraint comprises: an elongated pole having a forward end; a generally U-shaped member having spaced ends coupled to the forward end of the pole; a pair of jaws each pivotally coupled to one of the spaced ends, the jaws pivotally movable between open and closed positions; a pair of flexible bands each coupled between one end of one of the jaws and one of the spaced ends of the generally U-shaped member forming a crossing intersection; and ratchet means operative upon the pair of jaws to freely permit the jaws to pivot inwardly from the open position to the closed position while preventing the jaws from pivoting outwardly from the closed position to the open position.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective view of a restraint constructed in accordance with the present invention;

FIG. 2 sets forth a top plan view of the grasping portion of the present invention restraint moving toward a to-be-grasped appendage; and FIG. 3 sets forth a top plan view of the present invention restraint grasping an appendage.

DESCRIPTION OF THE PREFERRED EMBODIMENT

FIG. 1 sets forth a perspective view of an improved restraint for grasping limbs and appendages constructed in accordance with the present invention and generally referenced by numeral 10. Restraint 10 includes an elongated preferably rigid pole 11 having a handle 13 at one end, a downwardly extending skate 12 near the remaining end and an intermediate pistol grip handle 17. A coupler 14 is secured to the remaining end of pole 11 and supports a pair of generally curved outwardly extending arms 15 and 16. Arms 15 and 16 are rigidly secured to coupler 14 and together form a generally open U-shaped support for a pair of articulated jaws 20 and 30. More specifically, restraint 10 further includes a slightly curved movable jaw 20 pivotably secured to arm 16 at a pivot 21. Jaw 20 further defines an outer end 22 and an inwardly facing gear portion 24. Similarly, a jaw 30 defines a slightly curved member pivotally secured to arm 15 by a pivot 31 and defining an outer end 32 and an inwardly facing gear portion 34. Jaw 20 further defines a downwardly extending post 23 near end 22 which receives and secures one end of a flexible band 25. Similarly, jaw 30 defines a downwardly extending post 33 receiving and securing one end of a flexible band 35. A post 26 is supported upon the upper surface of arm 16 beyond pivot 21 and receives and secures the remaining end of band 35. Similarly, arm 15 supports a downwardly extending post 36 which receives and secures the remaining end of flexible band 25. As can be seen, bands 25 and 35 intersect near the approximate midpoint of the spacing between jaws 20 and 30. In accordance with an important aspect of the present invention, a rigid annular ring 60 preferably formed of a high strength material such as steel or the like encircles the intersecting portions of bands 25 and 35. Bands 25 and 35 may be formed using virtually any high strength flexible material such as heavy fabric, leather, plastic, or rubber having a substantial flexibility with little or no stretch characteristics. It may be desirable in some applications however to utilize a relatively stretchable material for bands 25 and 35 in accordance with the intended use.

As mentioned, jaws 20 and 30 are pivotally secured to arms 16 and 15 respectively. In further accordance with the present invention and as is better seen in FIG. 2, the pivotal attachment of jaw 20 to arm 16 at pivot 21 further includes a ratchet mechanism generally referenced by numeral 40 which is operative upon the pivotal motion of jaw 20 to provide a one-way pivotal motion in the inward direction indicated by arrow 64 in FIG. 2 and limiting the return or outward motion of jaw 20 until the ratchet mechanism is released. Similarly, the pivotal attachment of jaw 30 to arm 15 at pivot 31 is controlled by a ratchet mechanism generally referenced by numeral 50. Ratchet 50 is also operative to facilitate or permit pivotal motion inwardly in the direction indicated by arrow 65 in FIG. 2 while preventing return or outward motion of jaw 30 until the ratchet mechanism has been released. Y-shaped cable 19 is coupled between ratchet levers 41 and 51 and trigger 18 to permit release of jaws 20 and 30. It will be apparent to those skilled in the art that a variety of locking or ratcheting mechanisms may be utilized to provide the lock characteristic of jaws 20 and 30 set forth below in greater detail. However, suffice it to note here that in accordance with an important aspect of the present invention, jaws 20 and 30 cooperate to pivot inwardly about pivots 21 and 31 respectively as restraint 10 is thrust forwardly against an appendage contacted by intersecting bands 25 and 35. As is also described below in greater detail, the force upon bands 25 and 35 pulls jaws 20 and 30 inwardly encircling the contacted appendage or limb and thereby trapping the appendage or limb between jaws 20 and 30 and the enveloping portions of bands 25 and 35 as is described below in greater detail.

Skate 12 is provided on the lower side of pole 11 to assist in spacing the forward or grasping portion of restraint 10 away from an underlying surface such as the ground or a floor or the like. Skate 12 may, therefore, be made larger or smaller in accordance with design preference. Alternatively, skate 12 may be eliminated entirely. While a variety of materials may be used to fabricate the present invention restraint, exemplary materials such as high strength synthetic or composite materials having lightweight, high rigidity and great strength as well as metals such as steel, aluminum or the like provide substantial advantage in fabricating the present invention restraint.

It should be noted that pole 11 is formed as a single member. However, pole 11 may also be formed of telescoping members 11A and 11B as shown in dashed-line having a junction 11C.

In the anticipated use, the operator manipulates restraint 10 grasping pole 11 at convenient points and orienting the open end of the grasping portion toward the target limb or appendage. Thereafter, the user thrusts restraint 10 forwardly toward the target limb or appendage such that the limb or appendage is positioned between jaws 20 and 30. Thereafter, the continued forward movement of restraint 10 causes bands 25 and 35 to contact the target limb or appendage. The continued thrust force forces bands 25 and 35 to conform to and begin to partially encircle the target appendage or limb while simultaneously drawing jaws 20 and 30 inwardly in a pivotal motion about pivot 21. FIG. 2 sets forth the initial thrusting or grasping operation in greater detail while FIG. 3 sets forth the present invention restraint in a completely engaged grasping position securing the target limb or appendage. It will be noted that virtually any appendage or limb portion of the target object may be grasped such as a human ankle, wrist, forearm or the like in accordance with the present invention. Once the target individual has been grasped and the restraint locks on, the appendage is secured and is not able to escape until ratchet mechanisms 40 and 50 are released.

FIG. 2 sets forth a partially sectioned top view of the grasping portion of restraint 10 at the initial point of engagement with a target appendage 61. Appendage 61 is provided for example and is shown in generally oval cross-section such as would normally be presented by a wrist or ankle portion of a human target. Pole 11 is shown in section view to avoid unnecessary elongation of FIG. 2. As described above, restraint 10 includes a pole 11 supporting a coupler 14 which in turn supports curved outwardly extending arms 15 and 16. It will be recognized that arms 15 and 16 may be commonly formed from a U-shaped member secured to coupler 14. It will be further recognized that the entire combination of arms 15 and 16 together with coupler 14 may be fabricated as a single integral molded unit. The important aspect of arms 15 and 16 and coupler 14 is their cooperative operation to provide spaced apart supports for pivots 21 and 31 in pivotally securing jaws 20 and 30.

Restraint 10 further includes a pair of slightly curved jaws 20 and 30 pivotally supported upon arms 16 and 15 respectively at pivots 21 and 31. As described above, jaw 20 includes an outer end 22 and a gear portion 24 extending inwardly from pivot 21. Jaw 20 further includes a downwardly extending post 23 near end 22 and a downwardly extending post 27 near pivot 21. Arm 16 further defines a downwardly extending post 45 and a limit stop 47 as well as an upwardly extending post 26 near the outer end thereof. Similarly, jaw 30 defines a slightly curved member having an outer end 32 supporting an upwardly extending post 33 and an upwardly extending post 37. Jaw 30 is pivotally secured to arm 15 by a pivot 31 and defines an inwardly extending gear portion 34. A downwardly extending post 36 extends from the underside of arm 15 while an upwardly extending post 55 extends from the upper surface of arm 15 together with a limit stop 57. Jaw 30 further defines an upwardly extending post 37. A flexible band 25 is coupled between post 23 of jaw 20 and post 36 of arm 15. Similarly, a flexible band 35 is coupled between post 33 of jaw 30 and post 26 of arm 16. As described above, bands 25 and 35 intersect near the center line of restraint 10 and a high strength annular ring commonly encircles bands 25 and 35 at their point of intersection.

A ratchet assembly generally referenced by numeral 50 includes a pivot 53 supporting an elongated ratchet lever 51 having an outer end 54 and an extending tooth 52. Tooth 52 engages gear portion 34 of jaw 30 to provide a locking action. A coil spring 56 is stretched between end 54 of ratchet lever 51 and post 55. Spring 56 provides a spring force urging ratchet level 51 in a pivotal manner about pivot 53 against stop 57. A second spring 58 is coupled between post 55 of arm 15 and post 37 of jaw 30. The offset of post 37 from pivot 31 together with the drawing force of spring 58 urges jaw 30 toward pivotal motion outwardly about pivot 31 to draw band 35 into moderate tension.

An identical ratchet assembly generally referenced by numeral 40 is supported upon the underside of arm 16. Thus, ratchet assembly 40 includes a pivot 43 pivotally supporting a ratchet lever 41 having an end 44 and a tooth 42 extending toward gear portion 24 of jaw 20. A coil spring 46 is stretched between end 44 of lever 41 and post 45 to provide a spring force urging lever 41 in a pivotal motion about pivot 43 against stop 47. A second coil spring 48 is coupled between post 45 of arm 16 and post 27 of jaw 20. The offset of post 27 from pivot 21 and the spring force provided by spring 48 urge a pivotal motion of jaw 20 outwardly about pivot 21 drawing band 25 in moderate tension.

In the position shown in FIG. 2, jaws 20 and 30 are urged to their outermost positions by springs 48 and 58 respectively while ratchet levers 41 and 51 engage gear portions 24 and 34 of jaws 20 and 30. This defines the open position of restraint 10 and the position in which restraint 10 is prepared for use.

In its anticipated use, restraint 10 is thrust forwardly in the direction indicated by arrow 62 against a typical appendage 61 such that jaws 20 and 30 lie on opposite sides of the appendage. It will be apparent to those skilled in the art that the preferred orientation of the present invention restraint is that in which the plane of jaws 20 and 30 is preferably perpendicular to or at least at a substantial angle to the axis of the target appendage. Thus, for example, if the target appendage is a human ankle, the preferred orientation of jaws 20 and 30 is at or near a horizontal plane. Conversely, in the event the target appendage is an extending arm having a generally horizontal angular orientation, the preferred orientation of jaws 20 and 30 would be at or near a vertical plane. It will be apparent that appendages at angles between the horizontal and vertical plane would give rise to intermediate angular orientations of jaws 20 and 30.

Thus, with restraint 10 oriented in the desired plane with respect to appendage 61, the user thrusts forwardly in the direction of arrow 62 forcing bands 25 and 35 against the frontal portion of appendage 61. The thrusting force of the user causes appendage 61 to force the intersecting portion of bands 25 and 35 in the direction indicated by arrow 63. It should be noted that as restraint 10 continues forwardly in the direction of arrow 62, the relative motion of appendage 61 with respect to restraint 10 in the direction of arrow 63 causes bands 25 and 35 to bend about appendage 61 and further causes jaws 20 and 30 to be pivoted inwardly in the directions indicated by arrows 64 and 65. It should be noted that ratchets 40 and 50 are fabricated to permit the pivotal motion of gear portions 24 and 34 about pivots 21 in the direction resulting as jaws 20 and 30 pivot inwardly in the directions indicated by arrows 64 and 65. In essence, springs 46 and 56 are stretched as gear portions 24 and 34 are moved past teeth 42 and 52 of ratchet levers 41 and 51. This forward thrust continues until jaws 20 and 30 have completely enveloped appendage 61 and restraint 10 assumes the locking position shown in FIG. 3. It should be noted that while the embodiment shown in FIGS. 1 through 3 includes jaws 20 and 30 secured to each surface of arms 16 and 15, other fabrications may be used to secure jaws 20 and 30 such as placement on a common side of arms 16 and 15 or forming arms 16 and 15 with slots to receive the jaws.

FIG. 3 sets forth the present invention restraint in the fully locked position as the above-described thrust by the user has forced restraint 10 against appendage 61. As described above, arms 15 and 16 are rigidly secured by coupler 14 to pole 11 and support pivots 21 and 31 near the outer portions thereof. As is also described above, restraint 10 includes a pair of jaws 20 and 30 having inwardly extending gear portions 24 and 34 pivotally secured to arms 15 and 16. Jaw 20 defines an end 22 supporting a post 23 while jaw 30 defines an end 32 supporting a post 33. Arm 16 supports a post 26 while arm 15 supports a post 36. As is also described above, arm 15 supports a ratchet locking mechanism generally referenced by numeral 50 while an identical ratchet locking mechanism 40 is supported by arm 16 (seen in FIG. 2 in dashed-line representation). Ratchet 50 includes a pivot 53 supporting a ratchet lever 51 having a end 54 and a tooth 52 formed therein. A stop 57 is supported upon arm 15 together with a post 55. A post 37 is supported upon jaw 30. A spring 56 is stretched between end 54 of lever 51 and post 55. A spring 58 is stretched between post 37 of jaw 30 and post 55. Spring 56 provides a spring force urging ratchet lever 51 against stop 57. Tooth 52 of ratchet lever 51 engages gear portion 34 of arm 30. In the manner described above, an identical mechanism for ratchet 40 provides locking engagement of gear portion 24 of jaw 20. Flexible band 25 extends between post 23 of jaw 20 and post 36 of arm 15 while flexible band 35 extends between post 35 of jaw 30 and post 26 of arm 16. Ring 60 encircles the intersecting portions of bands 25 and 35.

In the locking position shown in FIG. 3, jaws 20 and 30 have pivoted inwardly to the overlapping position shown as bands 25 and 35 have partially encircled appendage 61. Ratchet mechanisms 40 and 50 are operative upon jaws 20 and 30 to provide one way pivotal movement thereof in which inward movement to envelope appendage 61 is freely permitted while outward motion is precluded. Thus, in the fully locked position shown in FIG. 3, ratchet mechanisms 40 and 50 are operative to prevent jaws 20 and 30 from pivoting outwardly and releasing appendage 61. For example, forces against jaw 30 in the outward direction require movement of gear portion 34 about pivot 31 in the counterclockwise direction. The engagement of tooth 52 with gear portion 34 requires that ratchet lever 51 be able to pivot about pivot 53 in the clockwise direction to permit the outward movement of jaw 30. However, limit stop 57 engages end 54 of ratchet lever 51 and prevents motion in this direction. As a result, ratchet lever 51 locks gear portion 34 against any outward pivotal motion of jaw 30. With temporary reference to FIG. 2, it will be apparent that an identical operation is provided by ratchet mechanism 40 which prevents jaw 20 from pivoting outwardly about pivot

21.

As a result, appendage 61 is secured within flexible bands 25 and 35 in a secure attachment which is extremely gentle to the target appendage but is nonetheless firm and secure. The encirclement of flexible bands 25 and 35 avoids the potential harm to the target appendage previously caused by other mechanisms which impose hard rigid objects upon the target appendage. In addition, the pivotal motion during the grasping operation of jaws 20 and 30 permits restraint 10 to accommodate a substantial variation of appendage cross-sectional diameters. For example, a smaller appendage having a smaller cross-sectional diameter than appendage 61 permits jaws 20 and 30 to pivot inwardly a great distance and results in a greater portion of flexible bands 25 and 35 encircling the target appendage. Conversely, a larger cross-sectional diameter appendage is completely grasped with less inward movement of jaws 20 and 30 than shown in FIG. 3 for appendage 61 while nonetheless securing the target appendage between bands 25 and 35 and jaws 20 and 30.

The present invention restraint may be returned to the open position shown in FIG. 2 by simply pivoting end 54 of ratchet lever 51 away from stop 57 to free tooth 52 from gear portion 34 and release jaw 30. Similarly, ratchet 40 is released by pivoting end 44 of lever 41 away from stop 47 to disengage tooth 52 from gear 24 and permit outward pivotal motion of jaw 20.

What has been shown is an effective and secure and improved restraint for grasping limbs and appendages. The restraint provides secure attachment to limbs and appendages of varying sizes while maintaining a secure but gentle grasping force. The use of flexible bands in captivating the appendage or limb provides substantial improvement over prior art devices which impose harsh rigid elements against the target appendage. The present invention restraint utilizes the encirclement of flexible bands to avoid the need for prohibitive gripping forces which other apparatus require for secure restraint.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in grasping an appendage or limb, a restraint comprising:

an elongated pole having a forward end;

a generally U-shaped member having spaced ends coupled to said forward end of said pole;

a pair of jaws each pivotally coupled to one of said spaced ends, said jaws pivotally movable between open and closed positions;

a pair of flexible bands each coupled between one end of one of said jaws and one of said spaced ends of said generally U-shaped member forming a crossing intersection; and ratchet means operative upon said pair of jaws to freely permit said jaws to pivot inwardly from said open position to said closed position while preventing said jaws from pivoting outwardly from said closed position to said open position.

2. A restraint as set forth in claim 1 further including a ring encircling said pair of flexible bands at said crossing intersection.

3. A restraint as set forth in claim 2 wherein said jaws each define elongated members having an inner end pivotally secured to one of said spaced ends and an outer end extending outwardly therefrom.

4. A restraint as set forth in claim 3 wherein said flexible bands each have one end coupled to an outer end of one of said jaws and one end coupled to the opposite one of said spaced ends.

5. A restraint as set forth in claim 4 wherein said ratchet means includes:

a pair of gear portions formed on said inner ends of said jaws; and a pair of spring-biased ratchet levers engaging said gear portions.

6. A restraint as set forth in claim 5 wherein said flexible bands are generally inelastic.

7. A restraint for use in grasping an appendage or limb, said restraint comprising:

a frame support having a pair of spaced apart ends;

an elongated pole coupled to said frame support;

a pair of jaws each pivotally coupled to one of said spaced apart ends and extending therefrom in a slightly diverging relationship to define a space therebetween;

locking means operative upon said jaws for permitting said jaws to pivot inwardly in a converging relationship while preventing said jaws to pivot outwardly from said converging relationship; and a pair of flexible bands each having one end coupled to one of said outer ends of said jaws and a remaining end coupled to said support frame forming a crossing point within said space.

8. A restraint as set forth in claim 7 further including a ring encircling said bands at said crossing point.

\* \* \* \* \*